United States Patent
Lax et al.

(10) Patent No.: US 10,777,085 B2
(45) Date of Patent: Sep. 15, 2020

(54) EFFICIENT FLIGHT PROFILES WITH MULTIPLE RTA CONSTRAINTS

(71) Applicant: GE Aviation Systems LLC, Grand Rapids, MI (US)

(72) Inventors: David Michael Lax, Grand Rapids, MI (US); Reza Ghaemi, Watervliet, NY (US); Mark Lawrence Darnell, Ada, MI (US); Nicholas Race Visser, Kentwood, MI (US)

(73) Assignee: GE Aviation Sytems LLC, Grand Rapids, MI (US)

( * ) Notice: Subject to any disclaimer, the term of this patent is extended or adjusted under 35 U.S.C. 154(b) by 0 days.

(21) Appl. No.: 15/946,206

(22) Filed: Apr. 5, 2018

(65) Prior Publication Data
US 2019/0311634 A1  Oct. 10, 2019

(51) Int. Cl.
*G08G 5/00* (2006.01)
*G05D 1/10* (2006.01)
*G07C 5/08* (2006.01)
*B64D 45/00* (2006.01)

(52) U.S. Cl.
CPC .......... *G08G 5/0039* (2013.01); *G05D 1/101* (2013.01); *G07C 5/0841* (2013.01); *G08G 5/0008* (2013.01); *G08G 5/0013* (2013.01); *G08G 5/0021* (2013.01); *G08G 5/0034* (2013.01); *G08G 5/0047* (2013.01); *B64D 2045/0075* (2013.01)

(58) Field of Classification Search
CPC .. G08G 5/0039; G08G 5/0013; G08G 5/0047; G08G 5/0008; G08G 5/0021; G08G 5/0034; G05D 1/101; G07C 5/0841; B64D 2045/0075
See application file for complete search history.

(56) References Cited

U.S. PATENT DOCUMENTS

| 4,642,775 A * | 2/1987 | Cline ..................... G01C 23/00 |
|---|---|---|
|  |  | 701/528 |
| 5,121,325 A | 6/1992 | DeJonge |
| 8,010,267 B2 | 8/2011 | Klooster et al. |
| 8,311,687 B2 | 11/2012 | Bakker |
| 8,321,072 B2 | 11/2012 | Coulmeau et al. |
| 8,332,145 B2 | 12/2012 | Dacre-Wright et al. |
| 8,406,939 B2 | 3/2013 | Jackson et al. |

(Continued)

*Primary Examiner* — Behrang Badii
*Assistant Examiner* — Daniel L Greene
(74) *Attorney, Agent, or Firm* — Dority & Manning, P.A.

(57) ABSTRACT

Methods, systems, and apparatuses for generating efficient flight profiles in a variety of aircraft are disclosed. A method includes receiving required time of arrival (RTA) constraints for the aerial vehicle. The RTA constraints include a required time of arrival for a waypoint. The method also includes inputting the RTA constraints into a problem configured to generate flight plans based on the required time of arrival for the waypoint of the RTA constraints. The problem includes an altitude variable and a speed variable. The method also includes generating, as a solution to the problem, a flight plan by varying the altitude variable and the speed variable in order to reduce operating cost of the aerial vehicle based at least in part on the RTA constraints, and providing the flight plan to at least one computing system of the aerial vehicle. The flight plan includes a route traversing the waypoint.

20 Claims, 11 Drawing Sheets

(56) References Cited

U.S. PATENT DOCUMENTS

| | | | |
|---|---|---|---|
| 9,026,275 B1 | 5/2015 | Young et al. | |
| 9,193,442 B1 | 11/2015 | Young et al. | |
| 9,330,574 B1 | 5/2016 | Young et al. | |
| 9,494,945 B2 | 11/2016 | Coulmeau et al. | |
| 10,049,586 B2 * | 8/2018 | Gallo Olalla | G08G 5/0052 |
| 2003/0093219 A1 | 5/2003 | Schultz et al. | |
| 2010/0149917 A1 * | 6/2010 | Imhof | G01V 1/345 367/53 |
| 2011/0002194 A1 * | 1/2011 | Imhof | G01V 1/32 367/53 |
| 2012/0085871 A1 * | 4/2012 | Chun | B61B 1/00 246/2 S |
| 2014/0257598 A1 | 9/2014 | Bailey et al. | |
| 2015/0344148 A1 * | 12/2015 | Schwartz | B64D 37/005 701/123 |
| 2016/0019795 A1 * | 1/2016 | Chircop | G08G 5/0008 701/7 |
| 2016/0063867 A1 * | 3/2016 | Zammit | G05D 1/101 701/18 |
| 2016/0236790 A1 * | 8/2016 | Knapp | B64C 11/001 |
| 2017/0132938 A1 * | 5/2017 | Lax | G06F 17/50 |
| 2017/0249849 A1 | 8/2017 | De Prins et al. | |
| 2018/0284813 A1 * | 10/2018 | Boyer | G08G 5/0069 |
| 2019/0005826 A1 * | 1/2019 | Lax | G01C 21/20 |

\* cited by examiner

EFFICIENT FLIGHT PROFILES WITH MULTIPLE RTA CONSTRAINTS

FIELD

The present subject matter relates generally to aircraft and, in particular, to generating efficient flight-control profiles and reducing fuel consumption in aircraft.

BACKGROUND

Flight plans may include a required time-of-arrival (RTA) assigned to multiple waypoints. Time constraints are required for managing traffic in controlled airspace. However, legacy systems generally find a guidance solution that complies with the constraint, but disregards monetary cost and fuel burn. With these inefficient flight plans, air crews generally carry additional fuel, which further decreases efficiency due to the additional fuel weight.

BRIEF DESCRIPTION

Aspects and advantages of the disclosed technology will be set forth in part in the following description, or may be obvious from the description, or may be learned through practice of the disclosure.

According to example aspects of the present disclosure, a computer-implemented method of route planning for an aerial vehicle includes receiving, at one or more processors, one or more required time-of-arrival (RTA) constraints associated with a plurality of waypoints that define a path the aerial vehicle is to traverse. Each RTA constraint of the one or more RTA constraint is associated with a single waypoint of the plurality of waypoints. The method also includes providing, by the one or more processors, the one or more RTA constraints to a non-linear program solver configured to generate one or more flight plans based on the one or more RTA constraints. The non-linear program solver can provide a non-constant altitude variable and a non-constant speed variable. The method also includes generating, by the one or more processors as an output of the non-linear program solver, at least one flight plan by varying the non-constant altitude variable and the non-constant speed variable in order to reduce a cost to operate the aerial vehicle based at least in part on the one or more RTA constraints, and providing, by the one or more processors, the at least one flight plan to at least one computing system of the aerial vehicle, the at least one flight plan including a route traversing the plurality of waypoints.

According to example aspects of the present disclosure, a non-transitory computer-readable medium can store computer instructions, that when executed by one or more processors, cause the one or more processors to perform operations. The operations can include receiving a required time of arrival (RTA) constraint for an aerial vehicle. The RTA constraint can include a required time of arrival for a waypoint. The operations can also include inputting the RTA constraint into a problem including at least two continually varying variables representing performance of the aerial vehicle. The at least two continually varying variables can be associated with an operating cost of the aerial vehicle. The operations can also include generating as a solution to the problem using a problem solver, at least one flight segment by varying the at least two continually varying variables to reduce the operating cost of the aerial vehicle based at least in part on the RTA constraint, and providing the at least one flight segment to at least one computing system of the aerial vehicle. The flight segment can traverse the waypoint.

According to example aspects of the present disclosure, a system can include a flight management system (FMS) and one or more processors in operative communication with the FMS. The one or more processors can be configured to perform a method including receiving, at the one or more processors, one or more required time of arrival (RTA) constraints for an aerial vehicle. The one or more RTA constraints include at least one required time of arrival for a waypoint. The method also includes creating, by the one or more processors, a non-linear programming problem including a non-constant altitude and a non-constant speed and solving, by the one or more processors using a non-linear programming problem solver, the non-linear programming problem to reduce direct operating cost of the aerial vehicle based on the one or more RTA constraints. The method also includes generating, by the one or more processors, a flight plan based on the solving the non-linear programming problem, and transmitting, by the one or more processors, the flight plan to the FMS. The flight plan can include a route traversing the waypoint.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
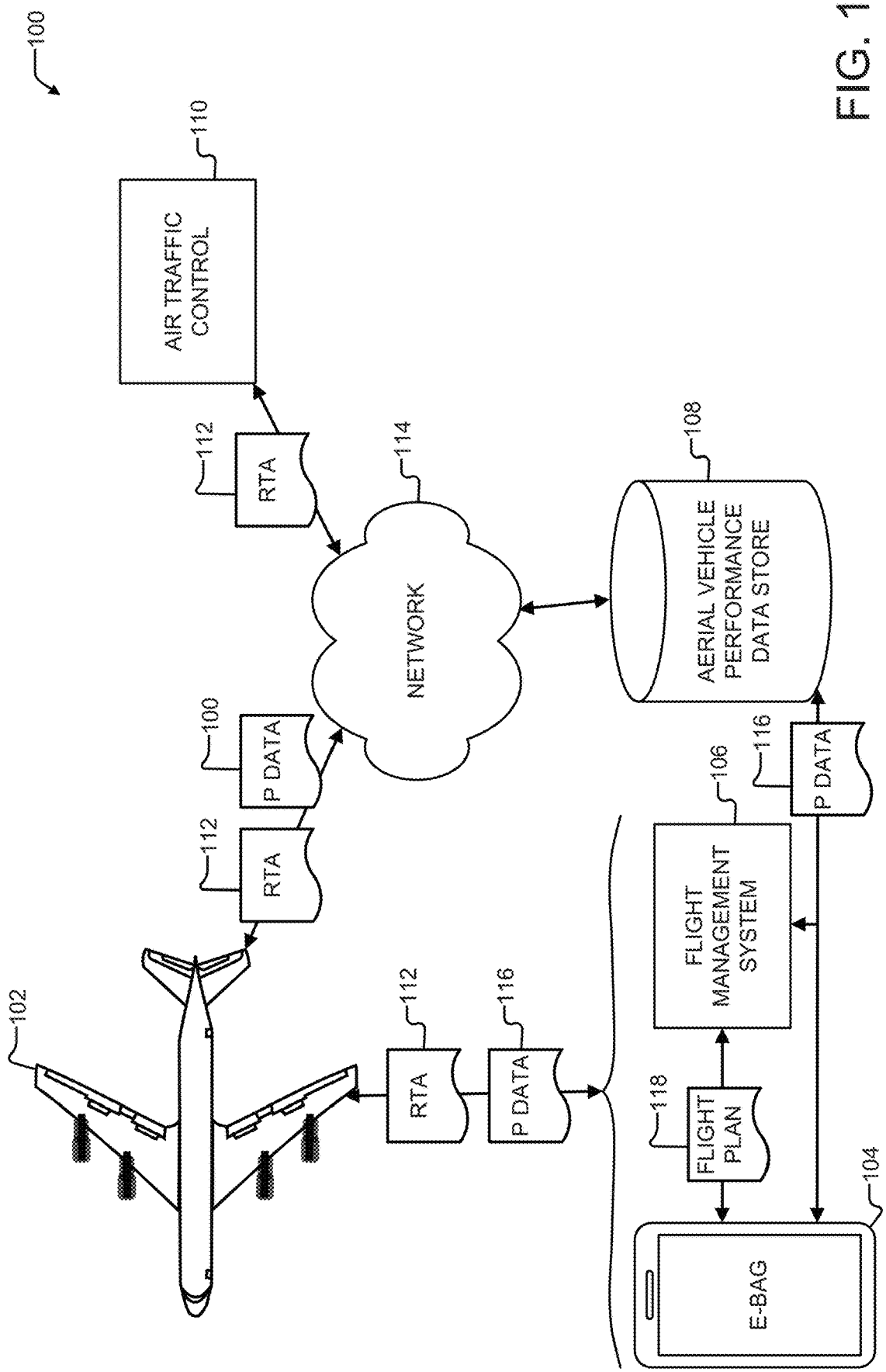
FIG. 1 is a schematic illustration of a system to generate flight plans for aerial vehicles, according to example embodiments of the present disclosure.

Reference now will be made in detail to embodiments of the disclosure, one or more examples of which are illustrated in the drawings. Each example is provided by way of explanation, not limitation of the disclosed embodiments. In fact, it will be apparent to those skilled in the art that various modifications and variations can be made in the present disclosure without departing from the scope or spirit of the claims. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to generating flight plans for aerial vehicles based on one or more required time of arrival (RTA) constraints. In some embodiments, a model or a problem can be used to generate flights plans based on minimizing and/or reducing operating costs of aircraft and various aerial vehicles. Aerial vehicles and associated systems, such as flight management systems or e-bag computer apparatuses, may receive one or more required time of arrival (RTA) constraints. The RTA constraints may be input directly by an operator or pilot, may be received from a computer apparatus on board the aerial vehicle, or may be communicated from a remote location or device, such as an air traffic control center, airline operations center, or other remote location or device.

The RTA constraints may include at least one time of arrival and at least one waypoint. Generally, the time of arrival may be a time at which the aerial vehicle is required to arrive or traverse a waypoint. However, the time of arrival may be a time before the aerial vehicle is required to arrive or traverse a waypoint, or the time of arrival may be a time after the aerial vehicle is required to arrive or traverse a waypoint. The waypoint may be a physical location or a logical waypoint associated with a physical location, such as a location on a map translated to a three dimensional location at a particular altitude. However, it should be understood that a simple latitude/longitude free from an altitude constraint may be an appropriate waypoint. Upon receipt of the RTA constraint or constraints, the aerial vehicle or associated system may input the RTA constraints into a problem or model configured to generate one or more flight plans based on the required time of arrival for the waypoint. In some examples, the aerial vehicle or associated system may formulate or generate a problem representing the RTA constraints, waypoints, fuel parameters, speed, altitude, aircraft performance data, and/or dynamics of the aircraft. The problem may vary or continually vary two or more variables, such as aircraft velocity, speed, trajectory, altitude, and other parameters/variables.

The aerial vehicle or associated system may generate as an output of the model at least one flight plan by varying the two or more variables in order to optimize fuel consumption of the aerial vehicle based at least in part on the RTA constraints. It is noted that the variables may vary throughout a flight, so variables are not necessarily held constant throughout the flight. In some examples, the problem may then be solved using the varying or non-constant airspeed, altitude, and other variables, such that the RTA constraints are met while operating cost is minimized compared to other flight plans. In this regard, more than one solution may exist where the aerial vehicle successfully meets RTA constraints. However, the solution with minimum or reduced operating cost as compared to other solutions may be chosen to increase overall efficiency of the solution. Thereafter, the aerial vehicle or associated system may generate a flight plan using the solution to the problem. The aerial vehicle or associated system may also implement the generated flight plan to minimize or reduce fuel use.

The systems and methods according to example aspects of the present disclosure can include optimization methods based on non-linear programming methods, weighted parameter loop problem method, optimization methods with penalties internal to a graph search/traversal (e.g., Dijkstra algorithm), neural network methods, Bayesian Global Optimization methods, regressions and heuristics methods, and other suitable methods. Each of these methods results in a more efficient computing process when solving for meeting RTA constraints. Accordingly, the method used in generating flight plans according to example embodiments results in reduced computing cycles as compared to other solutions.

In this way, the systems and methods according to example aspects of the present disclosure can have a technical effect of improving the efficiency of aircraft by utilizing non-constant variables to optimize flight plans. Further, the systems and methods according to example aspects of the present disclosure can have a technical effect of reducing operating costs and therefore increase a total amount of additional cargo or equipment an aerial vehicle can carry. Moreover, the systems and methods according to example aspects of the present disclosure can have a technical effect of reducing fuel consumption associated with changing, altering, or otherwise manipulating waypoints and/or RTA constraint in-flight, allowing for more efficient calculations with limited disruption to other tasks associated with operating an aerial vehicle.

FIG. 1 is a schematic illustration of a system 100 to generate flight plans for aerial vehicles, according to example embodiments of the present disclosure. The system 100 may include an aerial vehicle 102, such as an aircraft, airplane, unmanned aerial vehicle, or another suitable aerial vehicle. The aerial vehicle 102 may be in communication with an electronic flight bag (e.g., e-bag) 104 computer apparatus and a flight management system (FMS) 106. For example, the e-bag 104 and/or FMS 106 may be onboard the aerial vehicle 102. The e-bag 104 is an electronic information management device that can aid flight crews and personnel to perform flight management tasks. The e-bag 104 may be a general purpose computer apparatus or a special-purpose computer apparatus, depending upon a particular implementation. The FMS 106 may include functions such as in-flight management of a flight plan 118 associated with the aerial vehicle 102. The FMS 106 may use various sensors to determine the position of aerial vehicle 102 and to guide the aerial vehicle 102 based on the flight plan 118.

The aerial vehicle 102 may be in further communication with an aerial vehicle performance data store 108, either on-board the aerial vehicle 102, or over network 114. The network 114 is a simplified representation of any available communications network or networks used to communicate with the aerial vehicle 102. Therefore, the particular form illustrated should not be limiting of all implementations. For example, the network 114 can include wireless communications networks, wired networks, and other networks.

The store 108 may contain performance data and dynamics of various aircraft. For example, performance data may include fuel consumption data, airspeed data, engine data, and other data associated with performance of an aerial vehicle. Aircraft dynamics and associated data may include data related to performance of an aerial vehicle under varying weather conditions, altitudes, and other similar scenarios. The aerial vehicle 102 may be configured to retrieve or receive aerial vehicle performance data 116 from the store 108 directly, or over the network 114 in some instances. The performance data 116 may be related or associated with the aerial vehicle 102 or the model information for the aerial vehicle 102.

As further shown in FIG. 1, the aerial vehicle 102 may be in communication with an air traffic control center 110 over the network 114. The air traffic control center 110 may generate and transmit required time of arrival (RTA) 112 constraints for receipt by the aerial vehicle 102. The air traffic control center may also provide additional clearance data to the aerial vehicle 102, such as altitude clearance data and other suitable data.

The RTAs 112 can include one or more required times of arrival associated with one or more waypoints. The required times of arrival may include particular times that the aerial vehicle should traverse or stop at associated waypoints. The waypoints may be physical locations, such as locations on a map translated to a three dimensional location at a particular altitude, a latitude/longitude, or other similar locations. It is noted that the e-bag 104, the FMS 106, and/or the air traffic control center 110 may each generate flight plans or flight segments according to example embodiments of this disclosure. In some embodiments, a combination of the e-bag 104, the FMS 106, and the air traffic control center 110 may be used to generate flight plans or flight segments. Furthermore, any suitable computing apparatus may also be configured to generate flight plans in some implementations.

Upon receipt of the RTAs 112, the e-bag 104 or another computer system may generate a flight plan or flight segment. For example, one or more RTA constraints may be input into a system to generate a flight plan or flight segment. In some instances, the e-bag or other computer system may input the RTA constraints into one or more problems or models accessible to the computer system. The e-bag or other computer system may be used to input the one or more RTA constraints 112 into a problem or model configured to generate one or more flight plans. The one or more RTA constraints 112 may be used in the problem or model to generate one or more flight plans.

Figure 2:
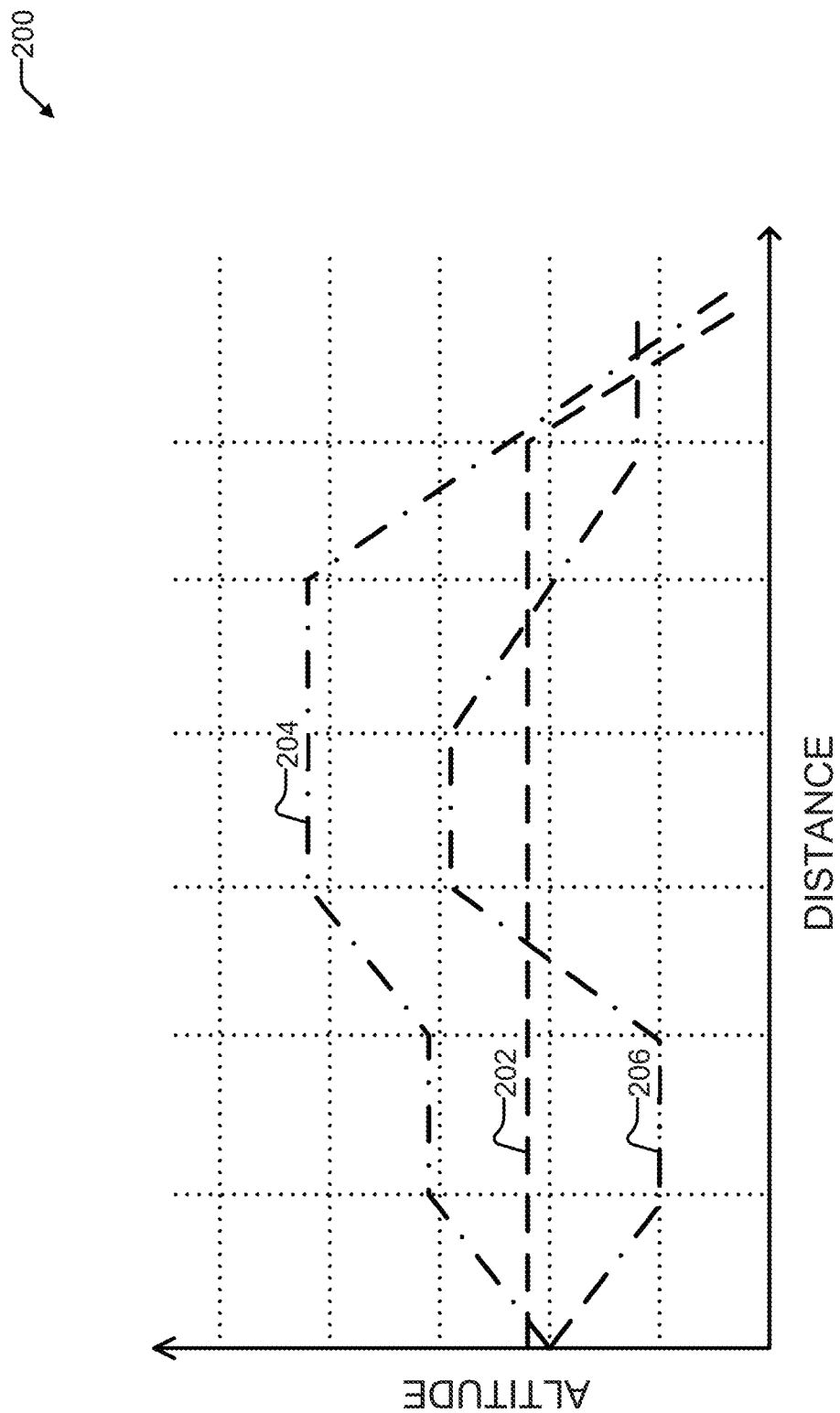
FIG. 2 is a graph showing multiple flight profiles with reduced fuel consumption, according to example embodiments of the present disclosure.

The e-bag 104 or another suitable computing apparatus may also formulate or generate the problem representing the RTAs 112 and performance data 116. The problem may vary or continually vary two or more variables, such as aircraft velocity, speed, trajectory, altitude, and other parameters/variables. For example, as illustrated in FIG. 2, the graph 200 depicts several flight plans with continually varying altitude and velocities. Accordingly, the graph 200 depicts non-constant altitudes and non-constant velocities. For example, the flight plan 202 may be a generally conventional flight plan with a constant altitude. However, the flight plans 204 and 206, using varying altitudes, may result in reduced operating cost. Accordingly, the e-bag 104 may determine a flight plan 204 or flight plan 206 with reduced operating cost while meeting the RTAs 112.

The problem may then be solved by the e-bag 104 or other computer system using the varying or non-constant airspeed, altitude, and other variables, such that the RTAs 112 are met while operating costs (e.g., fuel use, etc.) are minimized compared to other flight plans 202. Thereafter, the e-bag 104 or other computer system may generate a flight plan 118 using the solution to the problem (e.g., flight plan 204 or flight plan 206). The e-bag 104 or another system may also provide the flight plan to aerial vehicle systems such as FMS 106 or the air traffic control center 110. Furthermore, the FMS 106 may implement the flight plan 118 to minimize operating cost.

As described above, the system 100 may implement procedures to minimize operating cost and increase efficiency of the aerial vehicle 102 when one or more RTAs 112 are received at the aerial vehicle 102 or at a remote computer system. Hereinafter, a more detailed discussion of methodologies used to reduce operating cost and increase efficiency are presented with reference to FIG. 3, FIG. 4, FIG. 5, FIG. 6, and FIG. 7.

Figure 3:
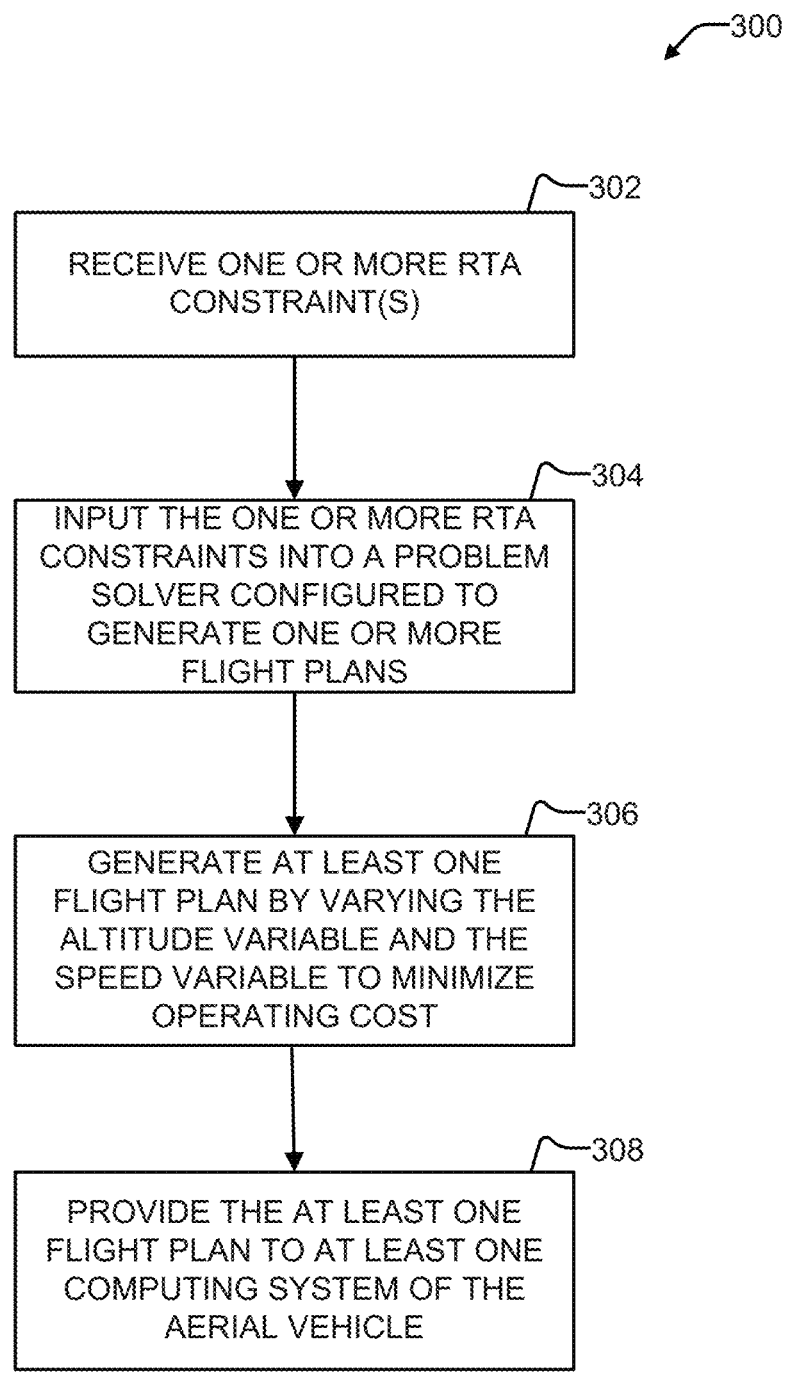
FIG. 3 is a flow diagram of a method of generating a flight plan or segment for an aerial vehicle, according to example embodiments of the present disclosure.

FIG. 3 is a flow diagram of a method 300 for generating a flight plan or segment for an aerial vehicle, according to example embodiments of the present disclosure. The method 300 includes receiving, at one or more processors (e.g., e-bag 104, FMS 106, or a computer system at air traffic control center 110), one or more required time of arrival (RTA) constraints 112 for the aerial vehicle 102, at block 302. In some aspects, each of the one or more RTA constraints includes at least one required time of arrival for at least one waypoint. Furthermore, the method 300 can be performed by either the e-bag 104, the FMS 106, air traffic control center 110, or any other suitable system The method 300 can further include inputting, by the one or more processors (e.g., e-bag 104), the one or more RTA constraints 112 into a problem configured to generate one or more flight plans based on the at least one required time of arrival for the at least one waypoint of the one or more RTA constraints, at block 304. The problem can include an altitude variable and a speed variable. In general, the altitude variable and the speed variable may be non-constant. Furthermore, the method 300, at block 304, can include inputting the one or more RTA constraints 112 into a non-linear program solver, in some implementations.

The method 300 can further include generating, by the one or more processors (e.g., e-bag 104) as an output of the problem using a problem solver, at least one flight plan 118 by varying the altitude variable and the speed variable in order to optimize operating costs of the aerial vehicle 102 based at least in part on the one or more RTA constraints 112, at block 306.

The method 300 can also include providing, by the one or more processors (e.g., e-bag 104), the at least one flight plan 118 to at least one computing system of the aerial vehicle, at block 308. The at least one flight plan 118 can include a route traversing the at least one waypoint.

Figure 4:
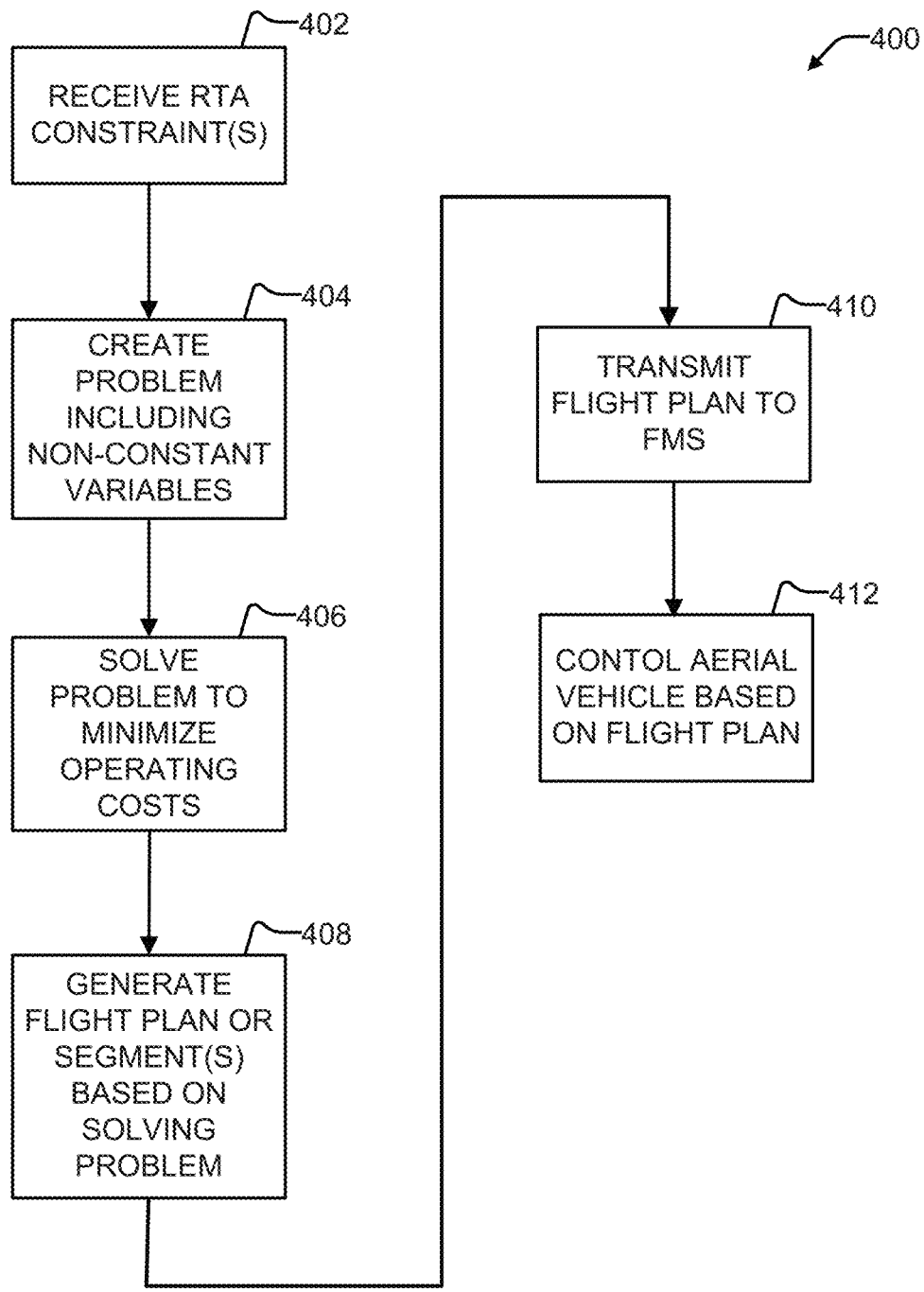
FIG. 4 is a flow diagram of a method of controlling an aerial vehicle based on a flight plan or segment, according to example embodiments of the present disclosure.

FIG. 4 is a flow diagram of a method 400 of controlling an aerial vehicle based on a flight plan or segment, according to example embodiments of the present disclosure. The method 400 can include receiving, at one or more processors (e.g., the e-bag 104), one or more required time of arrival (RTA) constraints 112 for the aerial vehicle 102, at block 402. Generally, the one or more RTA constraints 112 include at least one required time of arrival for at least one waypoint. The RTA constraints 112 can also include multiple RTA constraints and multiple waypoints. The RTA constraints 112 can be input manually by a pilot or personnel associated with the aerial vehicle 102, or can be received over a network such as network 114. Furthermore, the method 400 can be performed by the e-bag 104, the FMS 106, air traffic control center 110, or any other suitable system.

The method 400 can further include creating, by the one or more processors (e.g., e-bag 104), a problem including a non-constant altitude and a non-constant speed, at block 404. For example, the problem can include a nonlinear programming problem, an optimization problem, a weighted parameter loop problem, or any suitable problem or optimization model. The problem can be formulated by the e-bag 104 and can be processed at the e-bag 104.

The method 400 can also include solving, by the one or more processors (e.g., e-bag 104) and using a problem solver, the problem to minimize operating cost of the aerial vehicle 102 based on the one or more RTA constraints 112, at block 406. For example, the e-bag 104 can process the problem and RTA constraints to find a solution where operating cost is minimized compared to all possible, viable solutions that satisfy and/or meet the RTA constraints 112. For example, with reference to the graph 200, flight plan 206 may be one solution with non-constant altitude that minimizes operating costs. Block 406 may include generating a flight plan by varying the altitude variable and the speed variable to minimize operating cost while complying with time constraints.

Thereafter, the method 400 can include generating, by the one or more processors (e.g., e-bag 104), a flight plan 118 based on the solving the problem using the problem solver, at block 408. The flight plan 118 can include a route or flight segment traversing the at least one waypoint associated with the RTA constraints 112, and may also meet the RTA constraints 112.

The method 400 can also include transmitting the flight plan 118 to a flight management system (FMS) 106, at block 410. The FMS 106 can be configured to direct the aerial vehicle 102 to follow the flight plan 118 and to reduce operating costs based on application of the flight plan 118. Generally, the flight plan 118 can include at least one reference trajectory for the aerial vehicle 102 based on the non-constant altitude and/or velocity. Thus, the method 400 also includes controlling the aerial vehicle 102 to meet the at least one reference trajectory based on the flight plan 118, at block 412.

As described above, the method 400 includes receiving RTA constraints, creating a problem based on the RTA constraints and non-constant variables for aerial vehicle flight, and solving the problem using a problem solver to generate a flight plan that meets the RTA constraints while reducing operating costs. Hereinafter, methodologies including formulation of different problems and/or optimization models are described in detail with reference to FIG. 5, FIG. 6, and FIG. 7.

Figure 5:
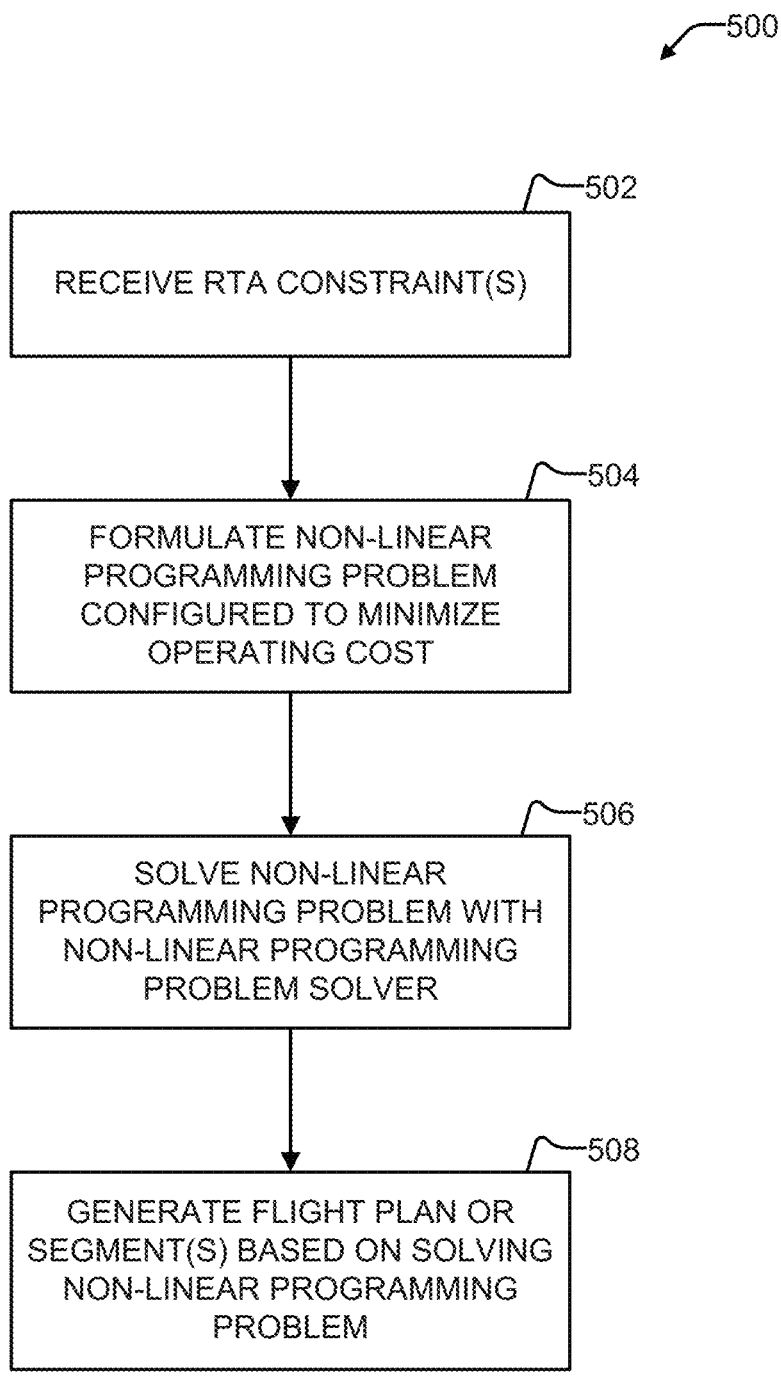
FIG. 5 is a flow diagram of a method of generating a flight plan or segment for an aerial vehicle based on non-linear programming problem, according to example embodiments of the present disclosure.

FIG. 5 is a flow diagram of a method 500 of generating a flight plan or segment for an aerial vehicle based on non-linear programming problem, according to example embodiments of the present disclosure. The method 500 can include receiving the RTA constraints 112, at block 502: The RTA constraints may include all data as described above. Furthermore, the block 502 can also include retrieving or receiving aerial vehicle performance data 116, in some implementations. The aerial vehicle performance data 116 can be received from a data store or directly from one or more electronic sensors of the aerial vehicle in some examples.

Thereafter, the method 500 includes formulating a non-linear programming problem configured to minimize operating costs of the aerial vehicle 102, at block 504. For example, each RTA 112 at each distance $x_i$, i=1, ... can be implemented in a non-linear programming problem in an optimization formulation in the form of a constraint on time, i.e., $t(x_i) \leq T_i$, i=1, .... The full optimization model can be formulated as Equation 1, set forth below:

$$\min_{\gamma,\pi,t_f,t_{c1},t_{c2}} J = \min_{\gamma,\pi,t_f,t_{c1},t_{c2}} \int_{t_0}^{t_f} [pV + V_w, h, \pi] dt \qquad \text{Equation 1:}$$

Equation 1 is based on the system Equation Set 2 (e.g., Equations 2 are the state equations used to define Equation 1), provided below:

$$\dot{E} = \frac{V}{m} f_x^s(h, V, m, \pi) \qquad \text{Equation Set 2}$$

$$\dot{h} = V\gamma$$

$$\dot{x} = V + V_w$$

$$\dot{m} = -\sigma(h, V, m, \pi)$$

$$E = gh + \frac{1}{2}V^2$$

$$\gamma = 0, t_{c1} < t < t_{c2}$$

$$x(t_f) = x_f$$

In Equation 1 and Equation Set 2, V is speed relative to the inertial reference frame, but expressed in the stability frame, m is the mass of the aerial vehicle 102, h is the altitude, E is specific energy, $\pi$ is the throttle setting and $\gamma$ is the flight path angle, $\sigma$ is the fuel flow, $V_w$ is the wind velocity, $t_0$ is the initial time and $t_f$ is the final time, which is unknown, and $x_f$ is the known target destination. $t_{c1}$ and $t_{c2}$ are the times when the cruise phase begins and ends and both are unknowns. The constraint on the flight path angle may ensure the altitude remains constant during the cruise phase. Since the target distance is known, the independent variable of optimization can be changed from time to distance to arrive at the following equivalent optimization problem, presented as Equation 3, below:

$$\min_{\gamma,\pi,x_f,x_{c1},x_{c2}} J = \min_{\gamma,\pi,t_f,t_{c1},t_{c2}} \int_{x_0}^{x_f} [pV + V_w, h, \pi]/(V+V_W) dx \qquad \text{Equation 3:}$$

For Equation 3, the following Equation Set 4 sets forth the associated system equations:

$$\dot{E} = \frac{V}{m} f_x^s(h, V, m, \pi)/(V+V_W) \qquad \text{Equation Set 4}$$

$$\dot{h} = V\gamma 1(x_{c1}, x, x_{c2})/(V+V_W)$$

$$\dot{t} = 1/(V+V_w)$$

$$\dot{m} = -\sigma(h, V, m, \pi)/(V+V_W)$$

$$E = gh + \frac{1}{2}V^2$$

$$1(x_{c1}, x, x_{c2}) = 0, x_{c1} < x < x_{c2}$$

$$\text{otherwise} = 1,$$

It is noted that in Equations 1 and 3 and the associated system Equation sets 2 and 4, the dot notation above a variable reflects the change with respect to distance, dx. It is noted that when meeting RTA constraints is not feasible, the same formulation can be used to meet RTA constraint as close as possible by making RTA constraint approach a soft constraint. Similar approaches also can by employed when RTA bypass is the only feasible approach.

Introducing any RTA for any way-point such as arrive at position $x_1$ at the time $t_1$, arrive at position $x_2$ at the time $t_2$ and so on leads to adding the following constraints to the optimization Problem 1:

$$t(x_1)=t_1, t(x_2)=t_2, \ldots \quad \text{Problem 1:}$$

Discretization of Problem 1 can be performed by dividing total distance into segments and using a transcription method to convert the differential equations to difference equations. In this example, $\gamma 1(x_{c1}, x, x_{c2})$ would take the form of $\gamma_i 1(x_{c1}, x_i, x_{c2})$ where $\gamma_i$ is the flight path angle corresponding to the distance $x_i$. Hence, the flight path optimization problem can be converted to non-linear programming problem that can handle multiple time-constrained paths, i.e., multiple RTAs 112.

Upon formulation of the non-linear programing problem, the method 500 further includes solving the non-linear programming problem using a non-linear programming problem solver, at block 506. For example, the optimal time of arrival at each distance $x_i$ can be determined which can be less than, equal to or greater than exactly each RTA 112. The method 500 also includes generating the flight plan 118 or at least a flight segment, based on solving the non-linear programming problem, at block 508. For example, all altitude calculations and flight trajectories noted above for the optimization problem 1 can be converted into a flight plan 118 for use by the FMS 106.

Figure 6:
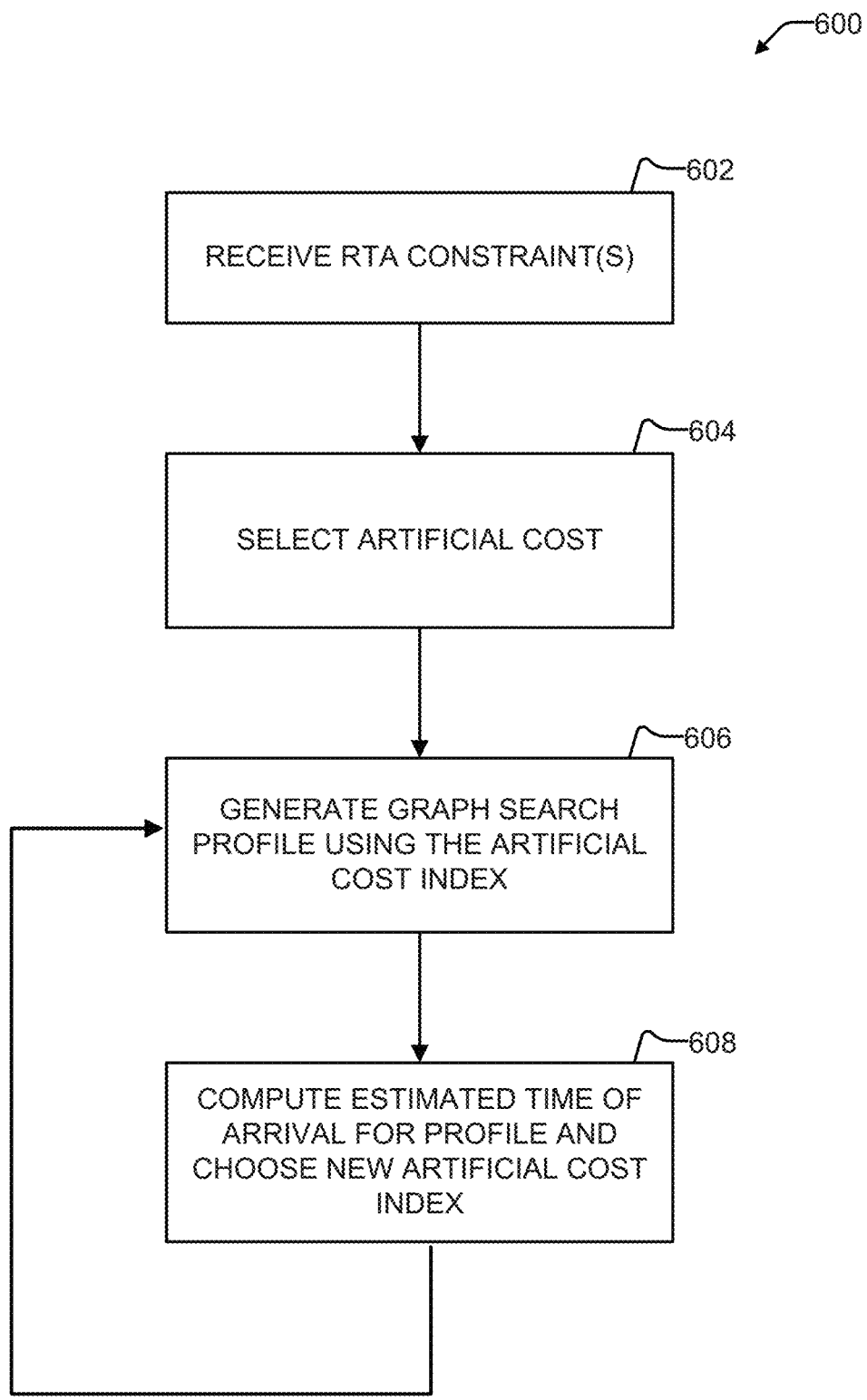
FIG. 6 is a flow diagram of a method of generating a flight plan or segment for an aerial vehicle based on a weighted parameter loop problem, according to example embodiments of the present disclosure.

FIG. 6 is a flow diagram of a method 600 of generating a flight plan or segment for an aerial vehicle based on a weighted parameter loop model, according to example embodiments of the present disclosure. As shown, RTA constraints are received and an artificial cost index is selected initially at blocks 602 and 604. Thereafter, a graph search profile is generated for the weighted parameter loop, using the selected artificial cost index, at block 606. Finally, an estimated time of arrival is computed and a new artificial cost index is chosen, at block 608. It is noted that method 600 may iterate until a viable solution to the weighted parameter loop is determined. As a further example, it is noted that one example of a weighted parameter loop may be a cost index loop.

Figure 7:
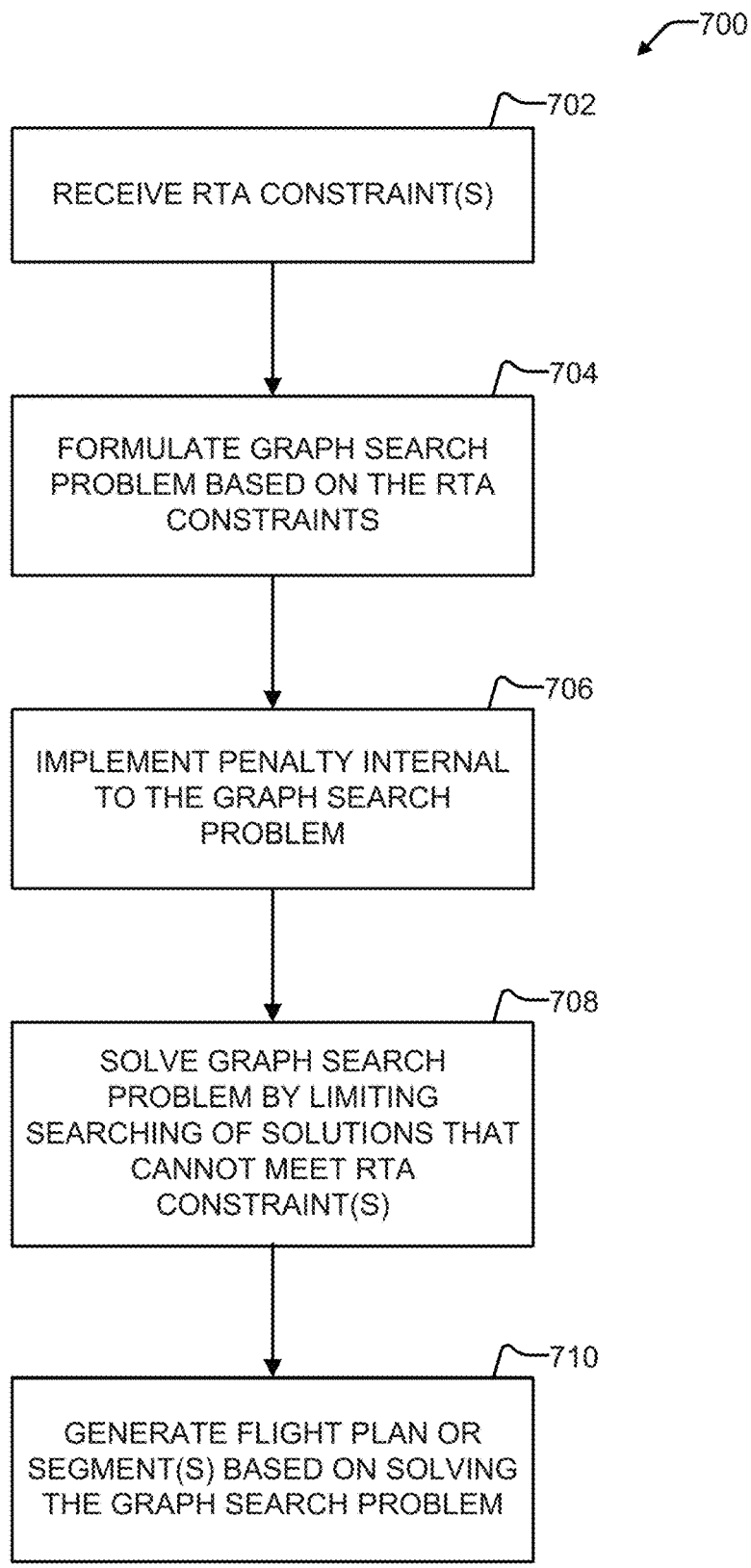
FIG. 7 is a flow diagram of a method of generating a flight plan or segment for an aerial vehicle based on a graph traversal problem, according to example embodiments of the present disclosure.
Figure 8:
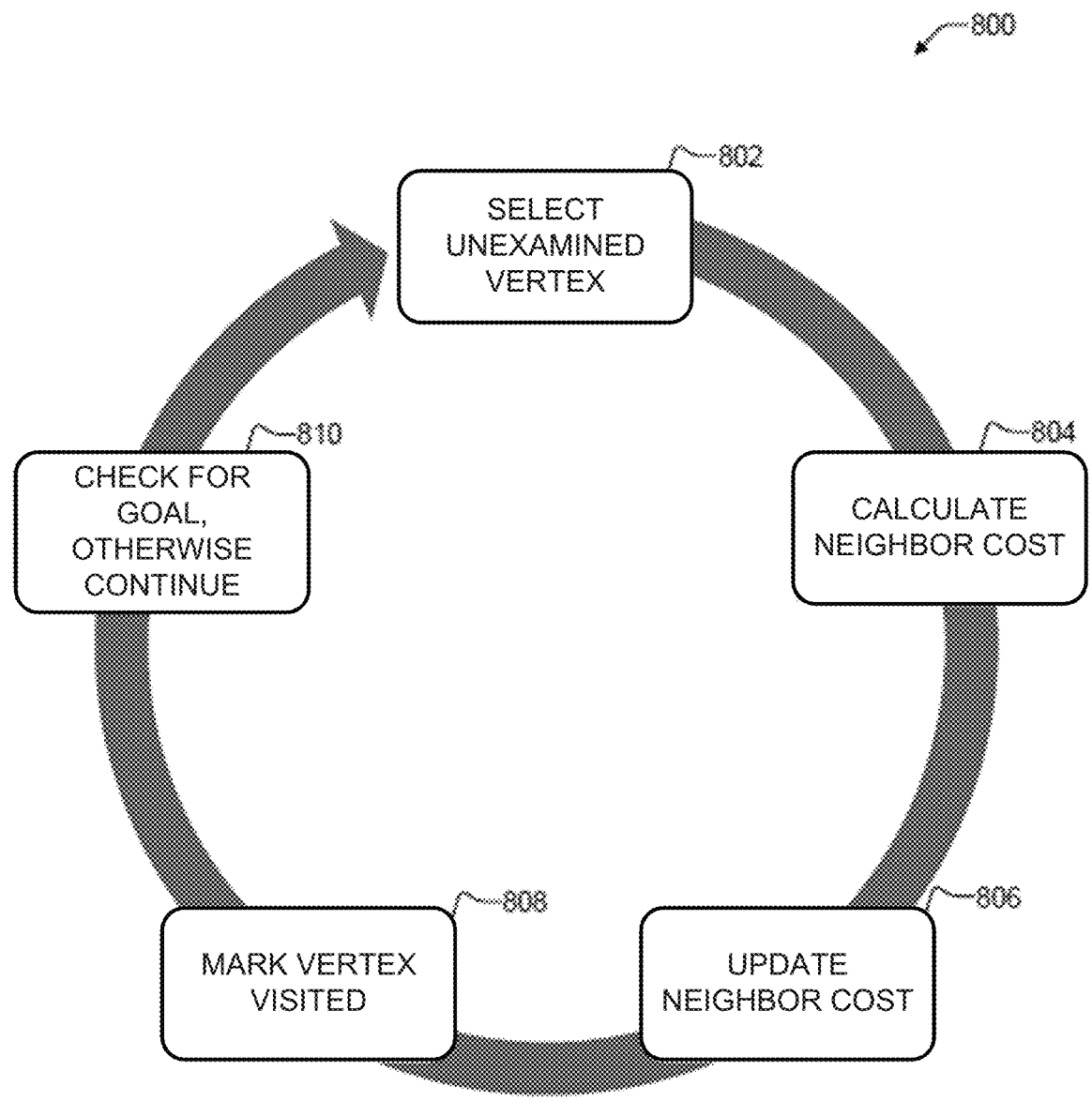
FIG. 8 is an example schematic of a graph traversal.

FIG. 7 is a flow diagram of a method 700 of generating a flight plan or segment for an aerial vehicle based on a graph traversal problem, according to example embodiments of the present disclosure. The method 700 can include receiving RTA constraints 112, at block 702. The RTA constraints 112 can include all data as described above. The method 700 further includes formulating a graph search or graph traversal problem, such as with a Dijkstra algorithm, at block 704. FIG. 8 illustrates the iterative traversal of a graph traversal problem of block 704. The graph traversal problem includes a plurality of vertices representing distance-altitude-speed tuples. Furthermore, speed and altitude may be control variables in this two dimensional representation. Finally, an initial vertex chosen to begin the graph search is chosen based on the initial cost index and a final vertex traversed in the computed RTA distance. Accordingly, the search traverses by selecting an unexamined vertex (802), calculating a neighbor cost which may include a cost to each neighbor (804), updating neighbor cost if there is a cheaper (less costly) route available (806), marking the vertex as visited (808), and determining if a goal has been reached, otherwise continuing the traversal (810).

Figure 9:
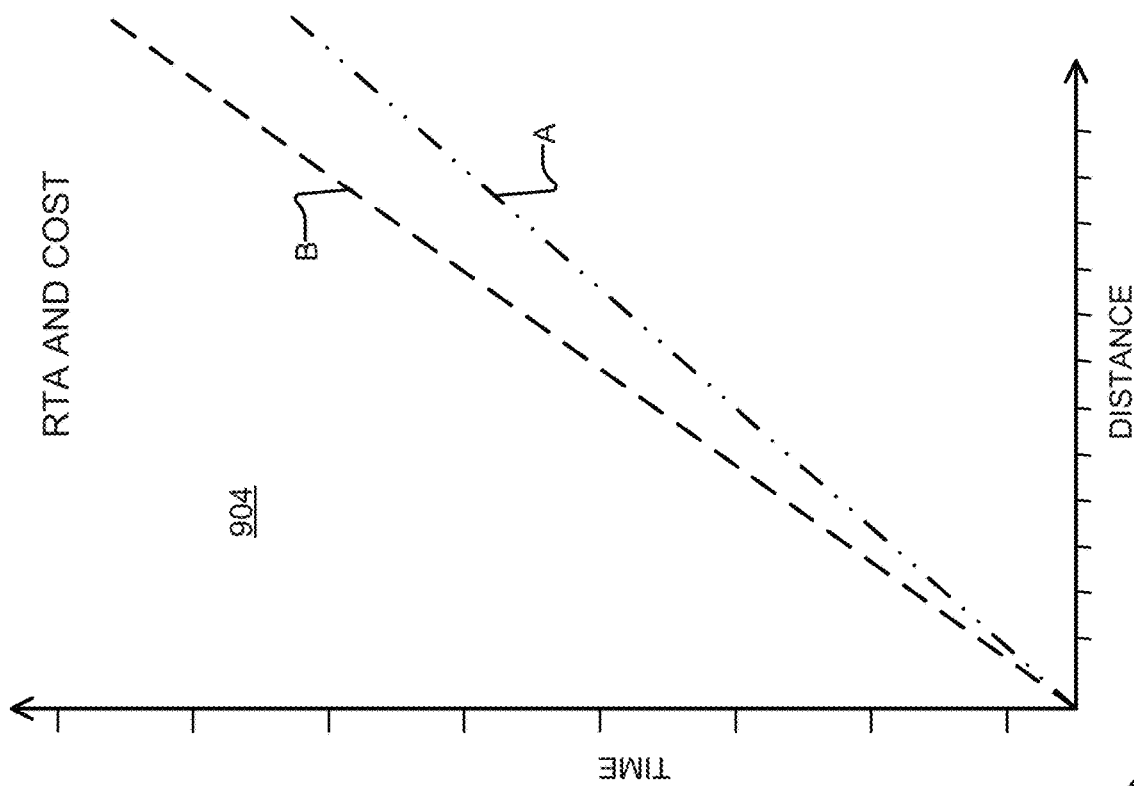
FIG. 9 is a graph showing results from a sample execution process of two differing flight profiles.
Figure 9:
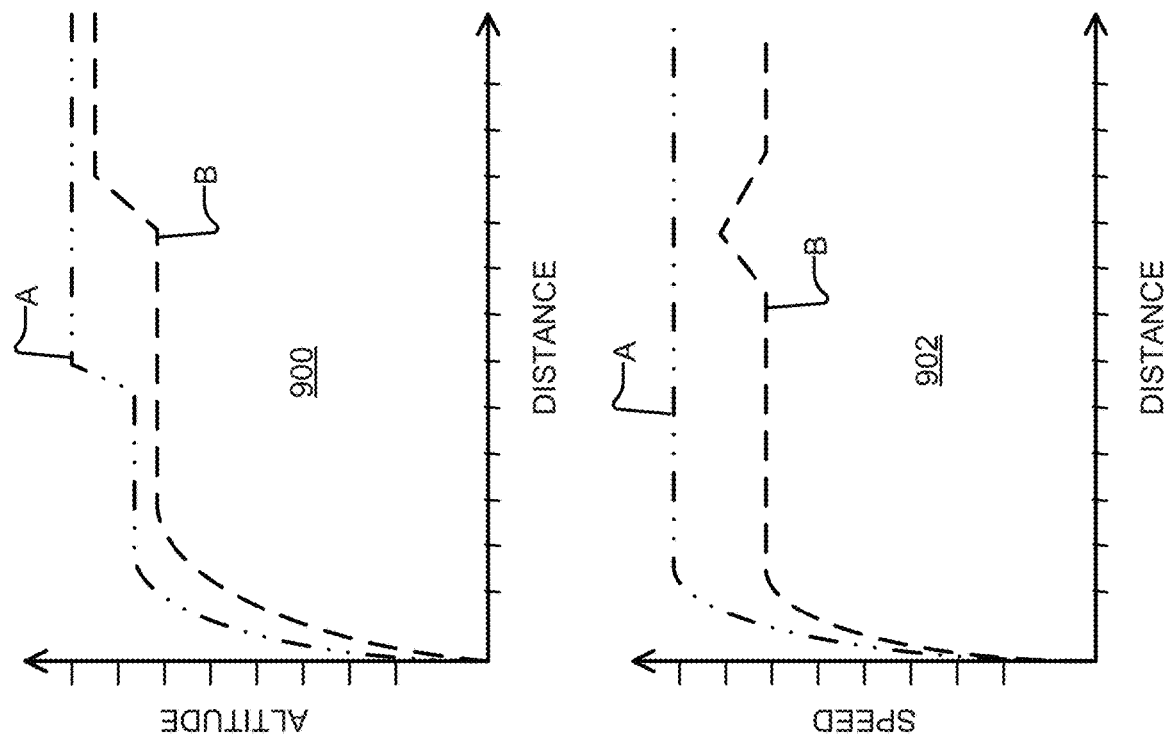
Figure 10:
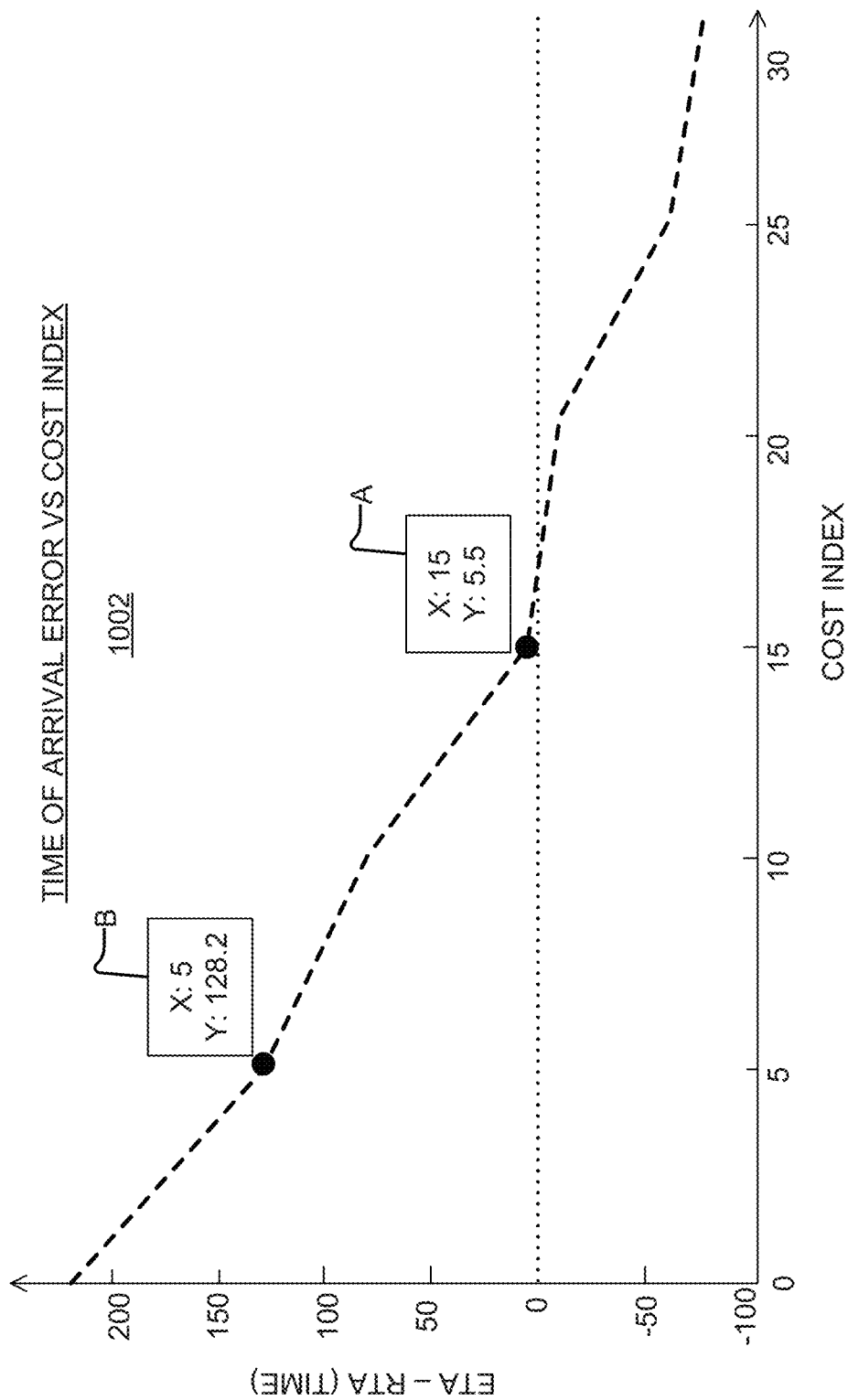
FIG. 10 is a graph showing results from a sample execution process of a weighted parameter loop.

As an example, referring to FIG. 9 and FIG. 10, several graphs of a sample execution process are provided. As shown, graphs 900 and 902 represent altitude and speed, respectively. Furthermore, graph 904 depicts RTA constraints and time of arrival. Finally, graph 1002 depicts error versus a particular cost index, further depicting that a cost index of 15 in this particular example, would result in an estimated time of arrival that is approximately 5 seconds late for a particular RTA. Accordingly, a minimum can be found as a quadratic loss function of $f(\text{cost index})=(\text{ETA}-\text{RTA})^2$ or another root finding technique. In these examples of problems, a proposed flight can be split into two segments, both pre-RTA and post-RTA. Thus, a portion of the search can be spent on reaching a waypoint at a particular RTA while the remainder of a flight plan can be estimated.

Turning back to FIG. 7, the formulation can include using the RTA 112 as a constant, while varying altitude, velocity, and other aerial vehicle operating parameters, as described above. Thus, operating cost can be optimized by iterating through the problem to identify an estimated time of arrival at a particular waypoint that is equal or substantially close to the associated RTA constraint. It is noted that the weighted parameter loop problem can also be formulated as an optimization model, a neural network models, Bayesian Global Optimization models, regressions and heuristics models, and other suitable models.

With regard to the cost index loop model, the method 600 can include implementing a penalty internal to the graph traversal algorithm, at block 706. For example, a graph traversal algorithm may typically include an exhaustive search of all graph vertices to calculate a particular cost for traversal to a graph neighbor.

With regard to penalty implementation, the method 700 can impose a penalty on nodes inside of graph search problem, at block 706. For the implementation, a cost index can be determined to balance fuel and time costs such that Direct Operating Cost=fuel cost+cost index*time cost. Subsequently, internal to graph search algorithm, the grid search can determine a trial node based on priority queue. The penalty re-organizes the queue to put items that can't effectively meet the RTA on the bottom (i.e., so they don't get expanded further), such that Search Cost=fuel cost+cost index*time cost+penalty. As the search progresses, nodes that are duplicate (i.e., same state) can be collapsed with only the lowest cost node retained. In this example, state comparison functions are updated to collapse nodes with same final distance/altitude/time, as compared to distance and/or altitude and/or speed. Moreover, discretization of time in the comparison functions greatly affects optimality and computation time (i.e. what is considered to be an equivalent or collapsible time of arrival.)

With regard to imposing the penalty, designing a proper penalty function to sort the nodes in the priority queue includes a current penalty as "brute force". This brute force approach only penalizes nodes beyond RTA distance with infinite penalty if they don't meet the RTA time. Other penalties may use a look ahead to determine if achieving RTA would require such large control deviation that it either couldn't met the RTA, or would be very expensive.

The imposed penalty can be based on ability to meet RTA constraints, such as Cost=Direct_Operating_Cost+Penalty. Therefore, the penalty function limits searching for proposed profiles that cannot meet the RTA constraints, further increasing the efficiency of the cost index loop model.

Thereafter, the method 700 includes solving the graph search problem by limiting the searching of solutions that cannot meet the RTA constraints 112, at block 708. The method 700 also includes generating the flight plan 118 or at least a flight segment, based on solving the graph search problem, at block 710.

As described above, methods of reducing operating costs of aerial vehicles can include receiving, at one or more processors, one or more required time of arrival (RTA) constraints for the aerial vehicle. The one or more RTA constraints include at least one required time of arrival for at least one waypoint. The methods can also include creating, by the one or more processors, a problem including a non-constant altitude and a non-constant speed, solving, by the one or more processors implementing a problem solver, the problem to minimize operating costs of the aerial vehicle based on the one or more RTA constraints, and generating, by the one or more processors, a flight plan based on the solving the problem, the flight plan including a route traversing the at least one waypoint. The models can include non-linear programming problem, weighted parameter loop problems, graph traversal problems with penalties internal to a graph search algorithm, neural network models, Bayesian Global Optimization models, regressions and heuristics models, and other suitable problems and models. Hereinafter various computer hardware, processors, and associated components capable of performing the above methods are described in detail.

Figure 11:
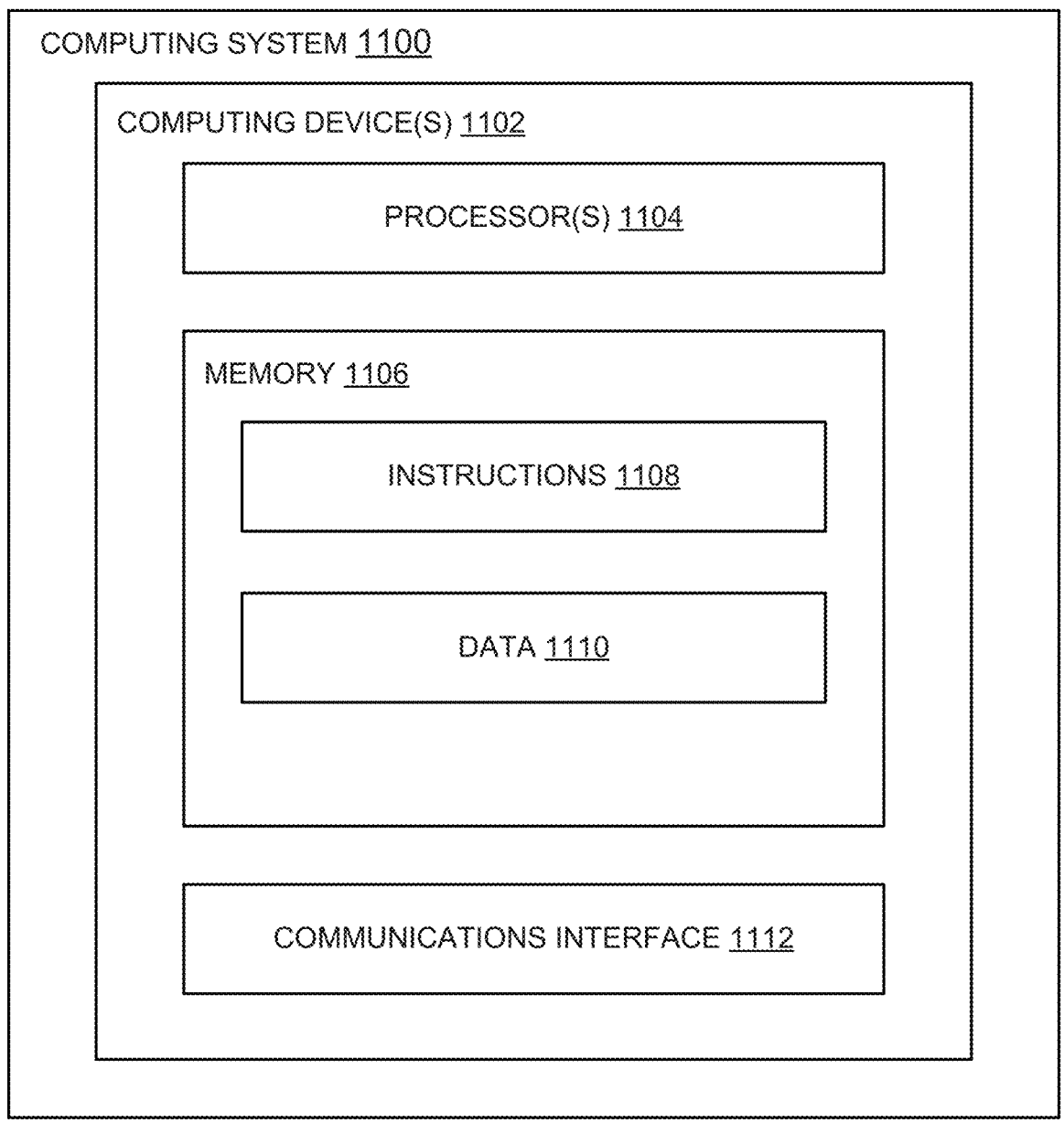
FIG. 11 is a block diagram of an example computing system that can be used to implement methods and systems according to example embodiments of the present disclosure.

FIG. 11 depicts a block diagram of an example computing system 1100 that can be used to implement one or more components of the system 100 or other systems according to example embodiments of the present disclosure. For instance, computing system 1100 may be used to implement e-bag 104, FMS 106, or another computing system at aerial vehicle 102 or air traffic control center 110. As shown, the computing system 1100 can include one or more computing device(s) 1102. The one or more computing device(s) 1102 can include one or more processor(s) 1104 and one or more memory device(s) 1106. The one or more processor(s) 1104 can include any suitable processing device, such as a microprocessor, microcontroller, integrated circuit, logic device, or other suitable processing device. The one or more memory device(s) 1106 can include one or more computer-readable media, including, but not limited to, non-transitory computer-readable media, RAM, ROM, hard drives, flash drives, or other memory devices.

The one or more memory device(s) 1106 can store information accessible by the one or more processor(s) 1104, including computer-readable instructions 1108 that can be executed by the one or more processor(s) 1104. The instructions 1108 can be any set of instructions that when executed by the one or more processor(s) 1104, cause the one or more processor(s) 1104 to perform operations. The instructions 1108 can be software written in any suitable programming language or can be implemented in hardware. In some embodiments, the instructions 1108 can be executed by the one or more processor(s) 1104 to cause the one or more processor(s) 1104 to perform operations, such as the operations for reducing operating cost of aerial vehicles, as described with reference to FIG. 3, FIG. 4, FIG. 5, FIG. 6, and/or FIG. 7.

The memory device(s) 1106 can further store data 1110 that can be accessed by the processors 1104. For example, the data 1110 can include required time of arrival (RTA) constraints, waypoint information, flight plan or flight segment information, vehicle parameters, prior flight plan data, as described herein. The data 1110 can include one or more table(s), function(s), algorithm(s), model(s), equation(s), etc. for minimizing fuel consumption and/or solving various models according to example embodiments of the present disclosure.

The one or more computing device(s) 1102 can also include a communication interface 1112 used to communicate, for example, with the other components of the system and/or other computing devices. The communication interface 1112 can include any suitable components for interfacing with one or more network(s), including, for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A computer-implemented method of route planning for an aerial vehicle, comprising:

receiving, at one or more processors, one or more required time-of-arrival (RTA) constraints associated with a plurality of waypoints that define a path the aerial vehicle is to traverse, the plurality of waypoints including a traversal waypoint and a stop waypoint, wherein each RTA constraint of the one or more RTA constraint is associated with a single waypoint of the plurality of waypoints;

providing, by the one or more processors, the one or more RTA constraints to a non-linear program solver configured to generate one or more flight plans based on the one or more RTA constraints, the non-linear program solver providing a non-constant altitude variable and a non-constant speed variable;

generating, by the one or more processors as an output of the non-linear program solver, at least one flight plan by varying the non-constant altitude variable and the non-constant speed variable in order to reduce a cost to operate the aerial vehicle based at least in part on the one or more RTA constraints; and providing, by the one or more processors, the at least one flight plan to at least one computing system of the aerial vehicle, the at least one flight plan including a route directing the aerial vehicle to the traversal waypoint and the stop waypoint at a required time.

2. The computer-implemented method of claim 1, further comprising:
formulating a non-linear programming problem using the non-linear program solver, the non-linear programming problem configured to reduce the cost of operating the aerial vehicle subject to dynamics of the aerial vehicle, weather data, and the one or more RTA constraints.

3. The computer-implemented method of claim 2, wherein the non-linear programming problem is further configured to continually vary the non-constant altitude variable and the non-constant speed variable to reduce the cost to operate the aerial vehicle.

4. The computer-implemented method of claim 3, wherein the non-linear programming problem is further configured to continually vary one or more additional aircraft variables, the one or more additional aircraft variables comprising aerial vehicle thrust, aerial vehicle climb rate, or aerial vehicle descent rate.

5. The computer-implemented method of claim 1, further comprising:
receiving, at the one or more processors, flight path data;
wherein generating the at least one flight plan is based at least in part on the flight path data.

6. The computer-implemented method of claim 5, further comprising:
receiving, at the one or more processors, vehicle performance data;
wherein generating the at least one flight plan is based at least in part on the vehicle performance data.

7. The computer-implemented method of claim 6, wherein generating the at least one flight plan includes at least partially solving the non-linear programming problem subject to aircraft dynamic constraints and the one or more RTA constraints such that the one or more RTA constraints are met with a lowest cost and while complying with the one or more RTA constraints.

8. The computer-implemented method of claim 1, further comprising:
receiving aircraft performance data for the aerial vehicle, and wherein generating as an output of the non-linear program solver at least one flight plan comprises using the aircraft performance data as additional variables.

9. The computer-implemented method of claim 1, wherein each of the one or more RTA constraints is uniquely assigned to a corresponding single waypoint in the flight plan.

10. The computer-implemented method of claim 1, wherein providing the at least one flight plan includes:
transmitting the at least one flight plan to a flight management system (FMS), the FMS configured to direct the aerial vehicle to follow the at least one flight plan and to minimize operating cost based on application of the at least one flight plan.

11. The computer-implemented method of claim 1, wherein generating the at least one flight plan comprises replacing an existing flight plan associated with the aerial vehicle.

12. The computer-implemented method of claim 1, wherein the at least one flight plan comprises at least one reference control trajectory, and wherein the computer-implemented method further comprises:
controlling the aerial vehicle to meet the at least one reference control trajectory.

13. The computer-implemented method of claim 1, further comprising:
formulating a weighted parameter loop problem for a flight segment under at least one RTA constraint of the one or more RTA constraints, the weighted parameter loop problem configured to determine an artificial cost index such that a solution to the weighted parameter loop problem meets the at least one RTA constraint.

14. The computer-implemented method of claim 1, further comprising:
formulating a graph traversal problem for a flight segment under at least one RTA constraint of the one or more RTA constraints; and
implementing a penalty internal to a graph search algorithm associated with the graph traversal problem, the penalty reorganizing a queue to limit searching of solutions that cannot meet the at least one RTA constraint.

15. A non-transitory computer-readable medium storing computer instructions, that when executed by one or more processors, cause the one or more processors to perform operations, the operations comprising:
receiving a required time of arrival (RTA) constraint for an aerial vehicle, wherein the RTA constraint includes a required time of arrival for a waypoint;
inputting the RTA constraint into a problem including at least two continually varying variables representing performance of the aerial vehicle, the at least two continually varying variables being associated with an operating cost of the aerial vehicle;
generating as a solution to the problem using a problem solver, at least one flight segment by varying the at least two continually varying variables to reduce the operating cost of the aerial vehicle based at least in part on the RTA constraint; and
providing the at least one flight segment to at least one computing system of the aerial vehicle, the flight segment traversing the waypoint at a non-constant altitude at along the flight segment.

16. The non-transitory computer-readable medium of claim 15, wherein the operations further comprise:
receiving a plurality of RTA constraints, the plurality of RTA constraints comprising a plurality of required times of arrival, each required time of arrival associated with a unique waypoint;
generating a plurality of flight segments for the plurality of RTA constraints using the problem to reduce the operating cost the aerial vehicle based on the plurality of RTA constraints; and
generating a flight plan comprising the plurality of flight segments traversing the waypoints.

17. The non-transitory computer-readable medium of claim 15, wherein the at least one flight segment comprises at least one reference control trajectory, and wherein the operations further comprise:
controlling the aerial vehicle to meet the at least one reference control trajectory.

18. The non-transitory computer-readable medium of claim 15, wherein the operations further comprise:
transmitting the at least one flight segment to a flight management system (FMS), the FMS configured to direct the aerial vehicle to follow the flight segment.

19. The non-transitory computer-readable medium of claim 15, further comprising:
receiving aircraft performance data for the aerial vehicle, wherein the aircraft performance data comprises one or more of a fuel efficiency and a fuel capacity, and wherein generating a plurality of flight segments comprises using the fuel efficiency and the fuel capacity as additional variables.

20. A system, comprising:

a flight management system (FMS); and one or more processors in operative communication with the FMS, the one or more processors configured to perform a method comprising:

receiving, at the one or more processors, one or more required time of arrival (RTA) constraints for an aerial vehicle, wherein the one or more RTA constraints include at least one required time of arrival for a waypoint;

creating, by the one or more processors, a non-linear programming problem including a non-constant altitude variable and a non-constant speed variable;

solving, by the one or more processors using a non-linear programming problem solver, the non-linear programming problem by varying the non-constant altitude variable and the non-constant speed variable to reduce direct operating cost of the aerial vehicle based on the one or more RTA constraints;

generating, by the one or more processors, a flight plan based on the solving the non-linear programming problem, the flight plan including a route traversing the waypoint; and transmitting, by the one or more processors, the flight plan to the FMS, the flight plan configured to operate the aerial vehicle at a non-constant altitude at along the flight plan.

\* \* \* \* \*